United States Patent [19]

Eshbach et al.

[11] Patent Number: 4,632,958
[45] Date of Patent: Dec. 30, 1986

[54] NBR/SILICATE BLENDS

[75] Inventors: John R. Eshbach; Ronald S. Lenox, both of Lancaster, Pa.

[73] Assignee: Armstrong World Industries, Inc., Lancaster, Pa.

[21] Appl. No.: 776,653

[22] Filed: Sep. 16, 1985

[51] Int. Cl.⁴ ............................................. C08L 9/00
[52] U.S. Cl. .................................... 524/574; 528/485
[58] Field of Search ......................... 524/574; 528/485

[56] References Cited

U.S. PATENT DOCUMENTS

| | | | |
|---|---|---|---|
| 2,298,713 | 10/1942 | Merrill | 528/485 |
| 2,378,693 | 6/1945 | Fryling | 528/485 |
| 2,459,748 | 1/1949 | Johnson | 528/485 |
| 2,510,370 | 6/1950 | Bixby | 528/485 |
| 2,597,872 | 5/1952 | Iler | 524/574 |
| 2,964,490 | 12/1960 | Howland et al. | 524/442 |
| 3,004,936 | 10/1961 | Howland et al. | 524/23 |
| 3,122,518 | 2/1964 | Logeman et al. | 524/442 |
| 3,169,939 | 2/1965 | Cordts et al. | 524/442 |
| 3,895,035 | 7/1975 | Berg et al. | 524/574 |
| 3,922,240 | 11/1975 | Berg et al. | 524/574 |
| 3,929,707 | 12/1975 | Berg et al. | 524/574 |
| 4,059,558 | 11/1977 | Golombeck et al. | 524/574 |
| 4,073,755 | 2/1978 | Berg et al. | 524/574 |
| 4,383,108 | 5/1983 | Jorgensen, Jr. | 528/487 |

FOREIGN PATENT DOCUMENTS

| | | | |
|---|---|---|---|
| 2425971 | 12/1974 | Fed. Rep. of Germany | 528/485 |
| 45-39549 | 12/1970 | Japan | 528/485 |
| 570234 | 6/1945 | United Kingdom | 528/485 |

Primary Examiner—Joseph L. Schofer
Assistant Examiner—N. Sarofim

[57] ABSTRACT

Process for preparing pulverulent NBR particles which can be utilized to form high tensile strength materials, comprising coprecipitating, via the use of an aluminum cation as a coprecipitating agent, NBR latex and a silicate from an aqueous suspension wherein the suspension has a temperature within the range of from about 0° C. to about 50° C. and a pH ranging from about 7 to about 10.

18 Claims, No Drawings

NBR/SILICATE BLENDS

BACKGROUND OF THE INVENTION

It has been discovered that, to realize improved mechanical properties and processing advantages, it is desirable to reinforce synthetic rubber materials with a variety of fillers. In particular, it has been proposed to produce homogenous rubber-silica mixtures by the coprecipitation of a synthetic rubber latex and an alkali metal silicate solution, such as via the utilization of a neutral electrolyte in the presence of an acid. As U.S. Pat. No. 3,849,363 points out, these methods have the disadvantages that only mixtures with a very low silica content are obtained, to which subsequently additional fillers, for example, colloidal kaolin or activated carbon, must be added.

The present invention provides for a process of making NBR rubber silicate mixtures that have superior mechanical properties, particularly tensile strengths, without the addition of other fillers.

DESCRIPTION OF THE INVENTION

The present invention provides for a process for preparing pulverulent NBR particles, which, in fact, are homogeneous particulate blends of NBR and a silicate, which can be utilized to form high tensile strength materials. The process comprises coprecipitating, via the use of aluminum cation as a coprecipitating agent, NBR latex and a water soluble silicate from an aqueous suspension which has a temperature ranging from about 0° C. to about 50° C. and a pH ranging from about 7 to about 10.

In the preferred process of the present invention, an aqueous aluminum ion solution is prepared in which the pH of the solution is adjusted to the range of from about 7 to about 10. To this solution there is added a mixture of a silicate and NBR latex to thereby form an aqueous suspension from which the NBR and silicate coprecipitate to form the pulverulent particles of the present invention. Prior to being combined, the solution and mixture are both independently maintained at temperatures ranging from about 0° C. to about 50° C.

Although it is indicated, throughout the present specification and claims, that the pulverent particles of the present invention are formed via a coprecipitation process, it is understood that this term is being used in its popular sense and, strictly speaking, what is taking place is not a coprecipitation but is rather a substantially simultaneous floccing of the latex and precipitation of the silicate, which take place, in the preferred process of the invention, almost immediately after the aluminum ion solution and the mixture of silicate and NBR are combined. However, for the sake of simplicity the term coprecipitation and the like will be used in the specification and claims for said simultaneous floccing and precipitation.

As stated above, the process of the present invention is specifically advantageous to importing high tensile strength to silicate reinforced NBR rubber. The term "NBR rubber" is understood to be used herein in its art recognized fashion to refer to nitrile rubber or, alternatively, acrylonitrile rubber, acrylonitrile-butadiene rubber and/or nitrile-butadiene rubber.

Any water soluble silicate which is compatible with the NBR latex and the specific aluminum cation precipitating agent being utilized is suitable for use in the present invention. The preferred silicates are sodium, potassium and ammonium silicates, with the most preferred silicate being sodium silicate.

The silicates utilized in the process of the present invention are, for the most part, commercially available in the form of an agueous solution. For example, when the silicate utilized in the process of the present invention is sodium silicate, it is believed that the concentration of sodium has little effect on the process of the present invention or the resultant product. Thus, any commercially available sodium silicate can typically be used in the process of the present invention. Typically, such sodium silicates will have a weight ratio of $SiO_2/Na_2O$ that ranges from about 1.5 to about 4, with the combined weight percent of $SiO_2$ and $Na_2O$ being no more than about 50 wt. percent of the silicate solution.

The weight ratio of the dry weight of the latex to the theoretical $SiO_2$ content of the silicate in the process of the present invention will range from about 1 to about 20, and preferably from about 2 to about 6. As the weight percent of the silicate utilized is increased relative to the NBR latex, the resultant particulate will accordingly be finer. If too much silicate is used—e.g., if the silicate is used substantially in excess of the latex—the resulting particulate may be so fine as to be unworkable.

In the coprecipitation step of present process, the pH of the aqueous reaction suspension (and, in the preferred method of this invention, the aluminum ion solution) will range between about 7 to 10, and preferably between about 8 to 9. It is an essential feature of the present invention that these pH's be acquired through the use of ammonium hydroxide as the base. It has been discovered that using other bases will not provide for an end product that has the same excellent mechanical properties as do the materials produced by the process of the present invention.

Once the coprecipation has occurred, the pH of the aqueous suspension may be optionally lowered to from about 4 to about 6 to assist in subsequent recovery, e.g. filtration, procedures.

The aqueous suspension will be, during the coprecipitation step, at a temperature of from about 0° C. to about 50° C, and most preferably from about 15° C. to about 30° C. At temperatures lower than 0° C., the latex will freeze, rendering it inoperable. Although the coprecipitation will occur at temperatures higher than 50° C., it has been discovered that the products formed via such high temperature processes will have mechanical properties, particularly tensile strengths, inferior to those formed via procedures run at the temperatures specified above. In the preferred method of this invention, both the aluminum ion solution and the mixture of NBR latex and silicate will be independently maintained at temperatures ranging from about 0° C. to about 50° C, and preferably from about 15° C. to about 30° C.

The agent utilized to simultaneously precipitate the silicate and flocculate the NBR latex, which is alternatively referred to in the present specification and claims as the "coprecipitation agent", is an $Al^{+3}$ cation. The cation is preferably derived from alum, which is utilized herein in its art recognized sense as standing for aluminum ammonium sulfate, aluminum potassium sulfate and aluminum sulfate.

Pragmatically speaking, the minimum amount of aluminum cation that may be utilized in the present invention will that amount that is required to cause the precipitation of the silicate. It has been discovered that, at the specific pH's at which the precipitation occurs even such minimum amounts will also serve to flocculate the NBR latex.

In a preferred mode of the present invention, the ratio of the moles of aluminum cation to the moles of the $SiO_2$ component of the silicate will range from about 0.5 to about 2.5, and preferably from about 1 to about 2. Generally, going beyond the upper limit of the broader molar ratio specify above will not prove deleterious to the physical properties of the materials produced according to the present invention. However, as a simple matter of process economics, it is not advisable to use a substantially excess amount of aluminum cation.

The precipitated NBR/silicate particulate mixtures of the present invention are recovered from the aqueous suspension by methods known in the art, for example, by filtration or decanting in accordance with conventional methods, e.g. on screens, rotary cellular fillers, vacuum filters or entrifuges, and are dried according to conventional processes, e.g., in belt dryers, sieve-drum dryers, fluidized-bed or spray drying plants, as well as plate dryers, preferably under constant motion.

The silicate/NBR particles of the present invention can be utilized as is to make high tensile strength materials such as hoses, belting and other articles in which nitrile rubber is commonly employed via procedures that are well known in the rubber industry. For example, the particles may be molded and cured either simultaneously or in separate steps. In addition, typical additives, which are chosen according to the desired properties of the end products, may be blended in with the particles of the present invention. Examples of such additives include pigments, inert fillers, antioxidants, antiburn agents, zinc oxide, vulcanizing agents and accelerators such as stearic acid, polyethylene glycol, sulfur, stearic acid, etc.

The following Examples, which are provided for the purpose of illustration and not limitation, show a preferred method of the process of the present invention.

The NBR latex utilized in the following Examples and Comparative Examples was obtained from Reichold Chemical Company and carried that company's designation of 68-513. The latex had an acrylonitrile content ranging from 28-32 wt %, a butadiene content of 67%, which includes from 2-3 wt % of styrene. However, it is understood that any NBR latex can be utilized in the process of the invention.

The silicate utilized in the Examples and Comparative Examples was a sodium silicate obtained from PQ Corporation, Philadelphia, PA and is designated as PQ sodium silicate N, and has a weight ratio ($SiO_2/Na_2O$) of 3.22, 8.90 percent $Na_2O$, 28.7% $SiO_2$ a density of 11.6 lb/gal and a viscosity (centipoise) of 180, both of the latter two values being determined at 68° F.

The alum used in the follwing Examples and Comparative Examples was $Al_2(SO_4)3.14H_2O$. In addition, a cure package was added to the particles produced in the Examples and the Comparative Examples prior to compounding for the purpose of providing an equal cure based on rubber content. The formulation of the cure package was as follows: (amounts based on weight parts per hundred for every 100 weight parts of NBR content).

| Zinc Oxide | 5 | pHr |
|---|---|---|
| Stearic Acid | 0.93 | pHr |
| Sulfur | 1.5 | pHr |

-continued

| Altax | 1.5 | pHr |
|---|---|---|
| TMTD | 0.5 | pHr |
| Total Weight | 9.43 | pHr, based on 100 weight parts of NBR content. |

The term Altax is a trademark of the Goodyear Tire and Rubber Company, Akron, Ohio, for benzothiazyl disulfide. The term TMTD as used above is an art recognized abbreviation for tetramethylthiuram disulfide.

EXAMPLE 1

To a solution of 130 g of alum in 1,880 ml of water, the temperature of which was approximately 25° C., there was added a sufficient amount of $NH_4OH$ to adjust the pH of the solution to a range of from 8 to 9. A mixture (also having a temperature of approximately 25° C.) was then prepared by mixing 87 grams of sodium silicate and 360 g (dry weight) of the NBR latex to 900 ml of water. This mixture was then slowly added, with agitation, to the alum solution to form the aqueous reaction suspension, with the resulting floccing of the latex and precipitation of the silicate to thereby form fine particles comprising a silicate/NBR mixture. After the particles were formed the pH of the solution was adjusted to a range of 4 to 6 by addition of a mineral acid (1 molar HCl). The particles were then filtered from the solution, washed with water and dried in a vacuum oven at 200° F. The inorganic ash in the particles was 22 wt %. The particles were then mixed with the standard cure package, compounded on a two roll mill, and then cured at 320° F. for 20 minutes in a flat bed press.

The tensile strength of the cured material was then measured as follows: a $\frac{1}{2} \times 6'' \times 0.075''$ sample of the cured material were held in jaws spaced $2\frac{1}{2}''$ apart on an Instron testing machine. The machine speed was $1''$/minute. The samples thus tested was found to have a tensile strength of 3853 lb/in$^2$ and a percent elongation of 342.

In this Example, the procedure of Example 1 was substantially repeated, with the exception that the alum solution contained 353 g of alum in 1847 ml of water and the mixture contained 123.7 g of silicate.

The samples thus produced were found to have a tensile strength of 3883 lb/in$^2$ and a percent elongation of 238. The inorganic ash in the particles was 29.5 wt %.

COMPARATIVE EXAMPLE 1

The procedure of Example 1 was substantially repeated, except that NaOH, rather than $NH_4OH$, was utilized to adjust the pH of the alum solution to a range of from 8 to 9. The cured sheet product thus produced was found to have a tensile strength of 2086 lb/in$^2$, a percent elongation of 403 and an inorganic ash content of 12.6 wt %.

COMPARATIVE EXAMPLE 2

The procedure of Example 1 was substantially repeated, except that the alum solution, and the final aqueous suspension, had a temperature of 85° C. The cured sheet product thus produced was tested to have a tensile strength of 2642 lbs/in$^2$, a percent elongation of 335 and an inorganic ash content of 19.6 wt percent.

A comparison of the above Examples and Comparative Examples illustrates that materials produced via the process of the present invention have significantly higher tensile strengths than those produced via the Comparative Examples.

What is claimed is:

1. A process for preparing pulverulent NBR particles which can be utilized to form high tensile strength materials, which process comprises coprecipitating, via the use of an aluminum cation as a coprecipitating agent, NBR latex and a water soluble silicate from an aqueous suspension wherein the suspension has a temperature within the range of from about 0° C. to about 50° C. and a pH ranging from about 7 to about 10, wherein further said pH is achieved by using ammonium hydroxide as a base, to thereby form said NBR particles.

2. The process of claim 1 wherein the pH of the suspension ranges from about 8 to about 9.

3. The process of claim 1 wherein the temperature of the suspension ranges from about 15° C. to about 30° C.

4. The process of claim 1 wherein the silicate is selected from solium silicate, potassium silicate or ammonium silicate.

5. The process of claim 4 wherein the silicate is sodium silicate.

6. The process of claim 1 which further comprises, following said coprecipitation step, lowering the pH of the suspension to from about 4 to about 6.

7. The process of claim 1 wherein said aluminum cation is derived from alum.

8. The pulverent NBR particles prepared by the process of claim 1.

9. A process for preparing pulverulent NBR particles which can be utilized to form high tensile strength materials, which process comprises (a) coprecipitating, via the use of an aluminum cation as a coprecipitating agent, NBR latex and a water soluble silicate from an aqueous suspension which is at a temperature within the range of from about 15° C. to about 30° C. and a pH ranging from about 8 to about 9, wherein further said pH is achieved by using ammonium hydroxide as a base, to thereby form said NBR particles; (b) lowering the pH of the suspension to from about 4 to about 6 and (c) recovering said particles from said suspension.

10. The process of claim 9 wherein said aluminum cation is derived from alum.

11. A process for preparing pulverulent NBR particles which can be utilized to form high tensile strength materials, which process comprises (a) preparing, in indifferent order (1) an aqueous solution containing an aluminum ion coprecipitation agent, wherein said solution has a pH that ranges from about 7 to about 10, wherein further said pH is achieved via the use of ammonium hydroxide as a base and (2) a mixture of a water soluble silicate and an NBR latex, wherein said mixture and said solution are independently maintained at a temperature which ranges from about 0° C. and about 50° C.; and (b) combining said solution and said mixture to form an aqueous suspension from which said silicate and NBR latex coprecipitate in the form of said particles.

12. The process of claim 11 wherein the pH of the aqueous solution ranges from about 8 to about 9.

13. The process of claim 11 wherein the temperature of both the mixture and the solution are independently maintained within the range of from about 15° C. to about 30° C.

14. The process of claim 11 wherein the silicate is selected from sodium silicate, potassium silicate or ammonium silicate.

15. The process of claim 14 wherein the silicate is sodium silicate.

16. The process of claim 11 which further comprises, following said coprecipitation step, lowering the pH of the suspension to from about 4 to about 6.

17. The process of claim 11 wherein said aluminum cation is derived from alum.

18. The pulverent NBR particles prepared by the process of claim 11.

* * * * *